United States Patent [19]

Impink, Jr. et al.

[11] Patent Number: 5,229,066
[45] Date of Patent: Jul. 20, 1993

[54] CONTROL ROD POSITION INDICATION SYSTEM

[75] Inventors: Albert J. Impink, Jr., Murrysville; Michael D. Heibel, Penn Township, Westmoreland County; Louis R. Grobmyer, North Huntingdon, all of Pa.

[73] Assignee: Westinghouse Electric Corp., Pittsburgh, Pa.

[21] Appl. No.: 740,354

[22] Filed: Aug. 5, 1991

[51] Int. Cl.$^5$ ............................................. G21C 17/00
[52] U.S. Cl. ................................. 376/258; 376/254; 376/255; 376/259; 250/390.12; 250/391; 250/392; 364/167.01; 364/559; 364/560
[58] Field of Search ............... 376/258, 259, 254, 255; 364/559, 560, 167.01; 250/391, 392, 390.12

[56] References Cited

U.S. PATENT DOCUMENTS

| | | | |
|---|---|---|---|
| 3,565,760 | 2/1971 | Parkos et al. | 176/24 |
| 4,066,497 | 1/1978 | Sato | 176/22 |
| 4,435,835 | 3/1984 | Sakow et al. | 382/8 |
| 4,637,910 | 1/1987 | Impink, Jr. | 376/216 |
| 4,927,594 | 5/1990 | Heibel et al. | 376/258 |

FOREIGN PATENT DOCUMENTS

| | | | |
|---|---|---|---|
| 212131 | 8/1984 | Fed. Rep. of Germany | 376/254 |
| 124987 | 7/1983 | Japan | 376/258 |
| 93997 | 5/1985 | Japan | 376/259 |
| 165592 | 8/1985 | Japan | 376/254 |
| 186784 | 9/1985 | Japan | 376/258 |
| 2079393 | 4/1987 | Japan | 376/254 |

Primary Examiner—Donald P. Walsh
Assistant Examiner—Chrisman D. Carroll
Attorney, Agent, or Firm—J. C. Valentine

[57] ABSTRACT

The present invention is a system which determines nuclear reactor control rod axial position using a deviation signature database generated from a current or reference signal pattern produced by one or more strings of axially dispersed fixed incore detector sections in the reactor core. The deviation signature database is produced by assuming deviant axial positions for the control rods in the core, calculating expected detector signals for the assumed positions and storing the deviation of expected signals from a calibration reference along with corresponding assumed rod positions. The signature database is periodically updated to take into account changed core conditions. When a change in detector responses is detected the system performs a signature analysis of the deviations in the signature database using the current deviation from the reference to search for the closest match. The change indicates not only the bank or individual rod that has moved but also the direction of movement allowing the search of the database to be circumscribed to the portion associated with the bank or individual rod and direction of movement. The closest match is used to incrementally search for the exact rod position by calculating expected response deviations for each assumed incremental move and comparing the expected response deviation to actual response deviations. If the system searches past the actual position, the last assumed position is output.

5 Claims, 4 Drawing Sheets

CONTROL ROD POSITION INDICATION SYSTEM

BACKGROUND OF THE INVENTION

1. Field of the Invention

The present invention is directed to a method and apparatus for determining the degree of insertion or the axial position of any and all control rods in a nuclear reactor core by analyzing the output signals of a number of strings of fixed location, neutron or gamma ray sensitive incore detectors.

2. Description of the Related Art

Knowing the position of control rods in a nuclear core of a nuclear reactor is essential to safe operation of a nuclear power plant as well as a legal requirement for continuation of an operating license. Currently control rod position, where control rods include safety rods, grey rods, shim rods and displacer rods, as well as specifically "control" rods, can be determined in two different ways.

The first uses a coil stack that sits on top of the reactor vessel in which the control rod drive shaft moves up and down. A magnetic impedance produced voltage generated by the coil stack is proportional to the length of the rod drive shaft residing in the coil stack, thereby allowing rod position to be inferred through the voltage output of each coil stack. Occasionally the rod position indicated by this system can be in question. Conventionally, the rod position at startup, as indicated by the coil stack indicators, is checked against the step demand counters to verify that the indicators are valid. If a rod position cannot be verified, because, for example, a coil stack is inoperable due to a mechanical or electrical failure, flux mapping can be performed to indicate rod position. If the position of the target rod cannot be verified, the rod position indicator must be considered inoperable. A reactor shutdown is usually necessary if more than one rod is considered inoperable.

The second method of determining rod position determines enthalpy rise deviations in core power distribution using core exit thermocouples and an inlet temperature detector to determine control rod position change relative to a rod reference position as described in U.S. Pat. No. 4,927,594. Because enthalpy deviation changes with respect to rod position, the change in rod position can be determined from the magnitude of the deviation. By adding the change to the reference rod position, the actual rod position can thereby be determined. The accuracy of the rod position determined by a system in accordance with this second method, needs to be enhanced and supplemented to provide the operator with the most reliable indication of rod position possible, so that unnecessary reactor shutdowns are avoided.

SUMMARY OF THE INVENTION

It is an object of the present invention to provide an enhanced method of determining control rod axial position in a nuclear reactor core.

It is another object of the present invention to supplement conventional rod position indication systems to provide plant operators with a diverse confirmation of rod position.

It is also an object of the present invention to provide power distribution signatures that allow rod position and distribution abnormalities to be detected.

It is also an object of the present invention to determine rod position by performing signature analysis on changes (deviations) in fixed incore detector responses.

It is a further object of the present invention to determine rod position during reactor changes when not at full power or in a steady state.

It is another object of the present invention to provide a protection grade rod position indication system, as defined by IEEE or ANSI standards.

The above objects can be attained by a system which determines rod position by first producing a fixed incore detector response signature database appropriate to current core conditions. When a core thermal neutron or gamma ray flux distribution perturbation is detected the approximate rod configuration is determined by scanning the database for a match. If a match is found the rod position is known. If a match is not found the closest rod configuration is used as a reference position from which a search is conducted to determine rod position.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
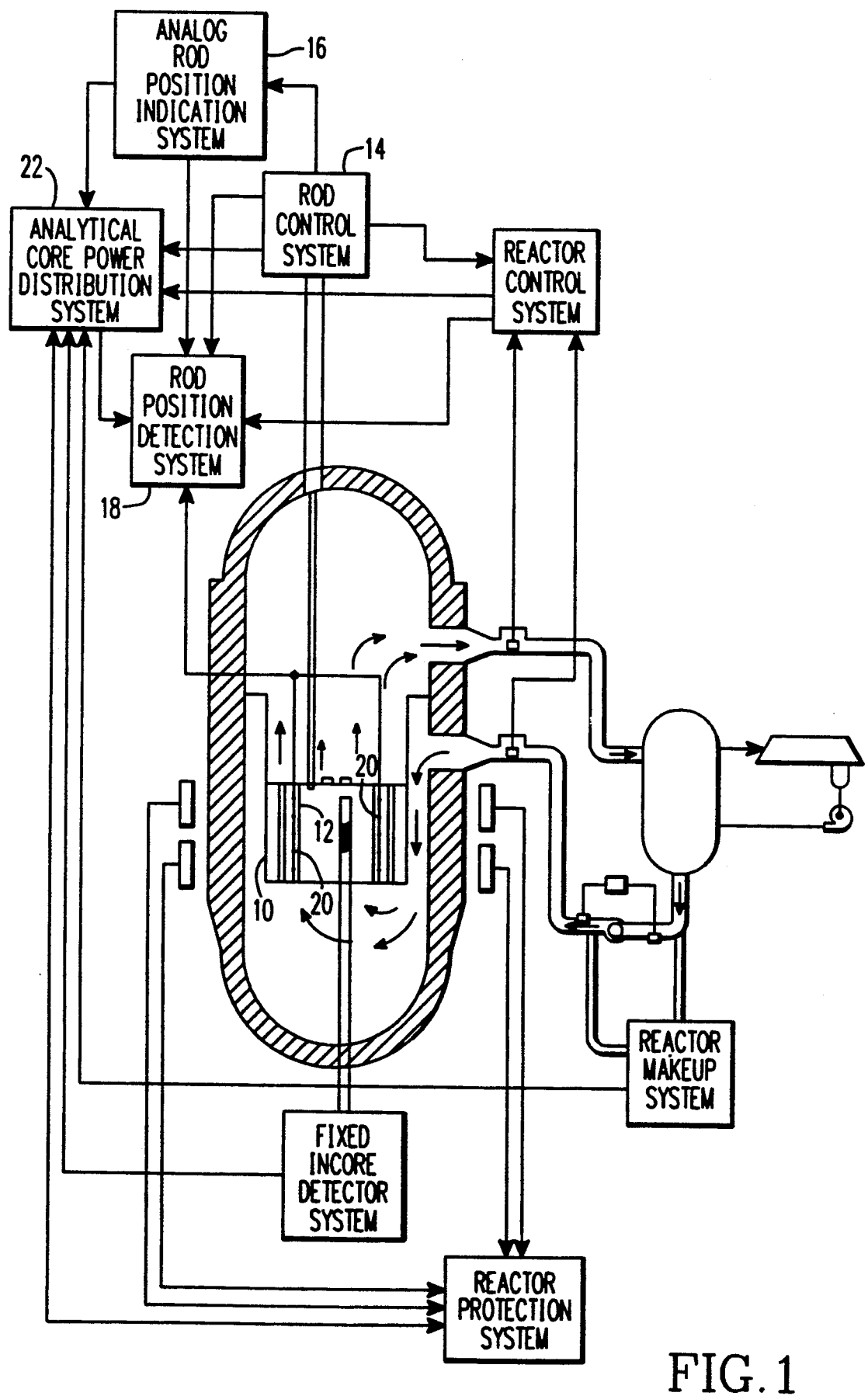
FIG. 1 illustrates the incorporation of the present invention into a nuclear reactor.

Inserting control rods into a nuclear reactor core causes a change in the axial and radial power distributions in the core. The changes in power distribution are correlated to changes in the signals from neutron or gamma ray detectors fixed in the core. The present invention utilizes measured deviations in fixed incore detector signals from established current reference values and correlates the deviations with rod axial positions to indicate rod position. The present invention provides an on-line, real time surveillance grade information system, as defined by IEEE or ANSI standards, for determining rod position and could, with suitable qualification, provide a protection grade, automatic reactor protection system.

The present system first begins with a known fixed incore detector signal pattern produced when the control rods are in a current known reference position. From this known configuration a signature database is created by assuming movement of the control rods in the reactor in varying increments and configurations to create incore detector signal deviation patterns to be used for signature analysis. This can be accomplished by assuming movement of the rods into one of the possible positions in one of the possible configurations, determining the expected detector responses and storing, in a permanent memory, such as a magnetic disk, the expected changes or deviations in fixed incore detector signals which would be produced in that configuration. The system then assumes movement of the rods to a new position within that configuration and the expected or predicted changes in fixed incore detector signals with respect to reference signals are again stored. Once the predicted fixed incore detector signal deviations in all of the rod positions in the configuration are stored, the system performs the same operations on the next configuration and so forth until expected fixed incore neutron detector signal deviation patterns are stored for each position within each configuration. The distance or number of rod position steps between each assumed position is a fixed number of steps so that a database can be created which will facilitate searching for the exact rod positions. The signature database is updated periodically as the plant operates where periodically may mean once a day when the plant is in a base load mode and once every fifteen minutes during or following a load change.

Once the signature database is created, when an anomaly is detected, such as when one or more incore detector responses deviate from the current reference responses or when a thermocouple response deviates from a current reference response, the signature database is scanned for a close match which, if it exists, indicates rod position. If a close match does not exist the closest configuration is used as a starting point for a search to find the exact rod position. This exact rod position is then compared to the rod position determined by the coil stack system or the thermocouple system.

The system performs the deviation measurements within a reactor core 10, as illustrated in FIG. 1, where control rods 12 are inserted into the core 10 by a rod control system 14 to control power output. An analog rod position indication system 16 produces rod positions magnetically as previously discussed. These positions are provided to the rod position detection system 18 which correlates the rod positions with the signals produced by fixed incore detector strings 20 residing in the core. The detector strings can be conventional six segment detectors. The rod position detection system can also receive position signals from the enthalpy rise deviation rod position system described in U.S. Pat. No. 4,927,594 as an alternative or supplement to the positions provided by system 16. A computer system suitable for performing not only the functions of creating the database but also for performing the calculations to be discussed herein is available from the Commercial Nuclear Fuels Division of Westinghouse and is associated with the BEACON system.

Figure 2A:
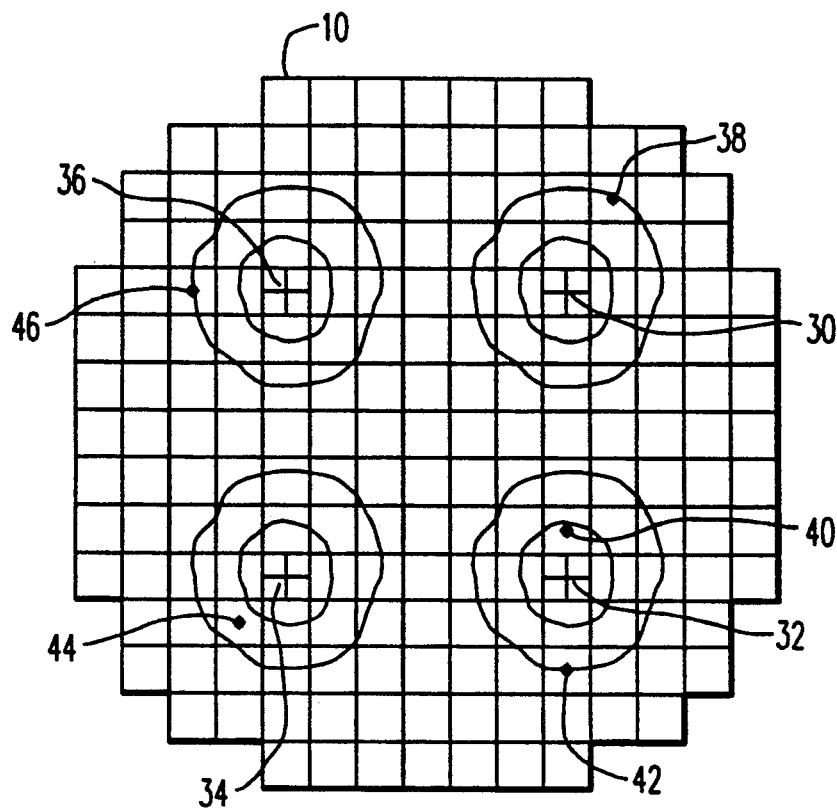
FIGS. 2A and 2B illustrate typical contours of deviations from a reference neutron density pattern.
Figure 2B:
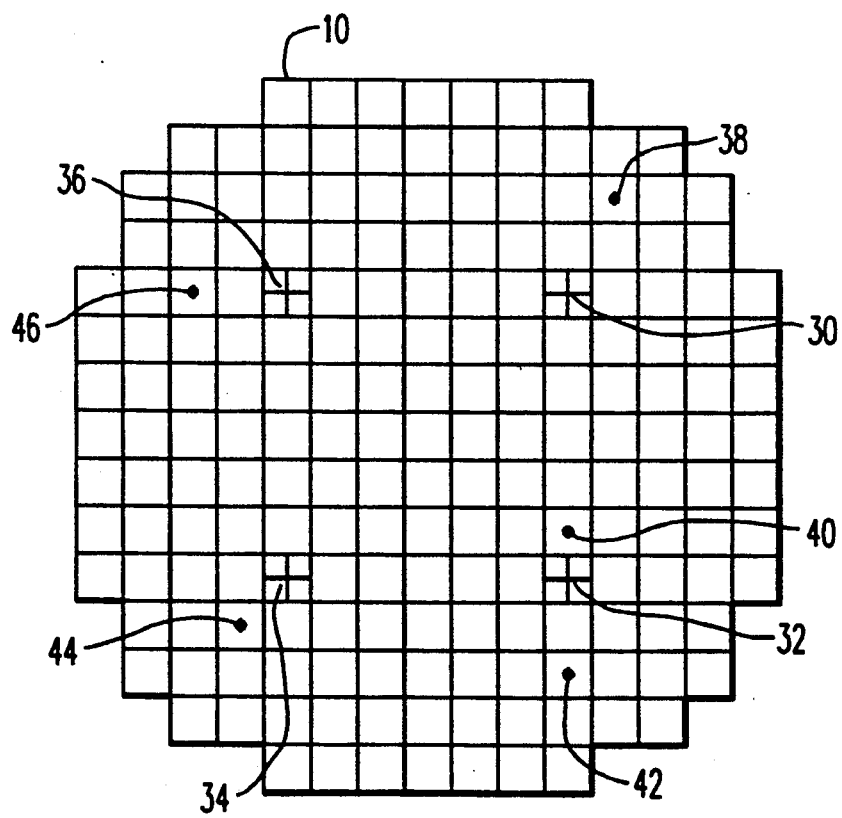

The present invention requires strings of fixed, incore thermal neutron or gamma ray sensitive detectors disposed in the reactor core so that at least one string of axially dispersed fixed incore detector sections is in the near vicinity of every control rod location in the core. It is also preferable that a detector string be located within a conventional King's move, as defined in chess, of each of the target control rods. With such a configuration, it is possible and practical to determine the degree of insertion of any individual control rod or any organized bank or configuration of control rods in the active region of the core by considering the pattern of output signals generated by the three dimensional array of fixed incore detectors in the reactor core. When the rods move in the core, the signals from the detectors within the core can be used to determine deviations from a previously stored current detector signal reference pattern for each axial section through the core as illustrated in FIGS. 2A and 2B. The deviation indicates an anomaly has occurred in the core. These figures illustrate four control rod locations 30-36 and five strings 38-46 of fixed incore neutron detectors. Each string includes typically six sections allowing the reactor to be divided into six different levels axially, however, depending on the core model used an alternate or different division of the core into axial regions is possible. FIGS. 2A and 2B illustrate typical contours of the deviations from the reference signal pattern which are detected by the detectors 38-46 of, for example, the first section or top most level and last or bottom most level. These figures illustrate control rods which are moved only partially into the core since a deviation pattern is shown in FIG. 2A and not in FIG. 2B. These deviation contour patterns would typically represent the levels associated with the highest and lowest detectors in a detector string with multiple detector sections. Typical deviation contour patterns allow the system to determine whether a rod has not been inserted into the level, that a rod has been inserted fully into the level, whether the rod has been inserted, for example, 30%, 50% and 70% into the level.

Figure 3:
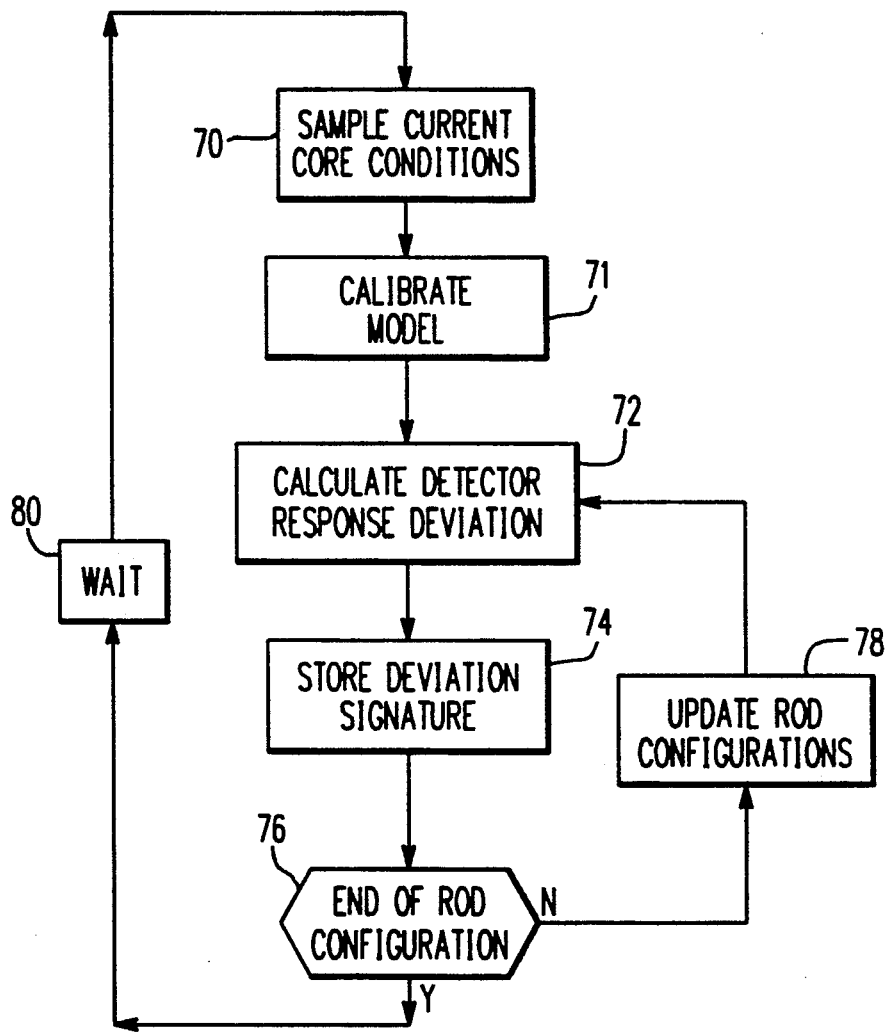
FIG. 3 illustrates a sequence of operations performed in the present invention to create a signature database.

The first step in performing the method of the present invention, as illustrated in FIG. 3, is to sample 70 the current core conditions which include not only the current rod positions used as a reference but also power level, inlet coolant temperature, etc. Once the current core conditions are sampled the system performs a routine calibration 71 of an analytical core analysis tool, such as the BEACON system available from the Commercial Nuclear Fuels Division of Westinghouse. Such an analytical core power distribution system has the capability, given input descriptions of certain system parameters such as reactor coolant system pressure and core inlet temperature, reactor power level and control rod insertion configuration and certain other core power distribution parameters, of calculating expected fixed incore neutron or gamma ray detector responses. The calibration step 71 involves the calculation of expected incore detector responses. If the calculated and measured responses do not agree within a predetermined degree of tolerance, the conventional control rod position indicator system is declared inoperable and the analysis tool must be adjusted. If adequate agreement exists both the measured and calculated responses are stored. Both the measured and calculated detector responses are stored because two measures of deviations need to be made, the first, the deviation of calculated detector responses from the calculated reference distribution and, the second, the deviation of measured detector responses from the measured distribution. Because the comparison is made in terms of deviations and not absolutes both reference distributions must be recorded. When the deviation database is constructed the calculated reference response distribution can be discarded.

The system next initiates a loop or set of calculations to determine what the calculated deviations in response would be in predetermined control rod configurations. The predetermined configurations include changes in the rod positions that would be anticipated in normal operations, for example control bank D ten steps farther in or out. Also included in the configurations are anticipated changes in controlling and overlap bank positions, for example control bank D fifty steps in or out and one hundred steps in or out, if relevant, with control bank C maintaining a programmed overlap. Such configurations can occur as a result of a partial loss of load or other upset. Other predetermined configurations which can be anticipated from possible failure modes of the rod drive system are also included, such as a rod drop or uncontrolled insertion or withdrawal. For each of these configurations the deviation response of the core to the change or perturbation is determined. This step involves a search of configurations based on boron concentration or average coolant temperature to establish criticality in the calculations involving minor changes in control rod position and, for example, a search on power level to maintain critically in severely perturbed configurations. This search for expected configurations is necessary because, in a "major" upset event, such as an uncontrolled insertion or withdrawal of a rod group or, conversely, a partial loss of load without a reactor trip, the automatic control system will adjust primary systems conditions in an attempt to maintain criticality at a reduced power level or at zero power. Thus, if the control system thinks it has detected a partial loss of load it will run rods into reduce core power output. Therefore, the search should reflect predictable behavior of the automatic control systems, since such behavior is expected. If the automatic control system response is not what is expected, a reactor trip will occur and the issue of control rod position is moot—all rods are in.

The predetermined configurations which should be used depend on the design of the core and rod control systems. A nuclear safety transient analysis engineer of skill in the art can develop a set of configurations for a particular reactor.

For each configuration the system calculates 72 the difference or deviation between the detector signals of the calibration step and what the expected or calculated signals would be. That is, the system calculates expected deviations between the current, analytically expected responses and analytically anticipated responses. The calculation 72 of the expected detector response deviations is performed by the analytical core analysis tool. Once the expected detector response deviations are calculated the rod positions and expected response deviations are stored 74 in a signature database. If all the anticipatable rod configurations from the reference have not been determined 76, the assumed rod configuration is incremented 78 and another signature is calculated. If all configurations have been calculated, the system waits 80 until it is time for another periodic update.

Figure 4:
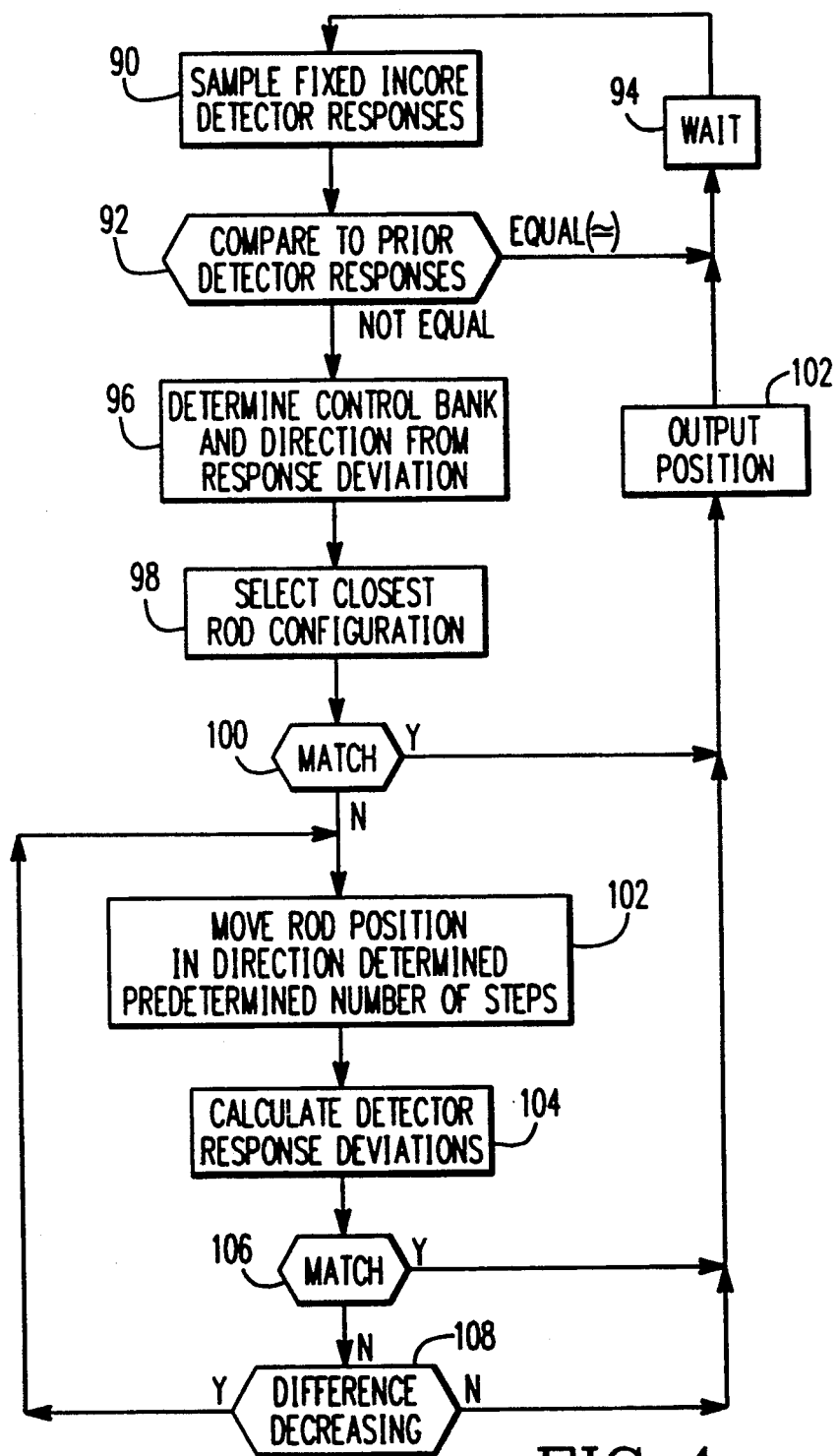
FIG. 4 illustrates the sequence of operations performed by the present invention to determine rod position using the signature database.

After the signature database is created the system enters a monitoring loop, as illustrated in FIG. 4, which looks for power distribution deviations from the observed reference. This loop is executed at least once a minute. In this loop the system samples 90 the fixed incore detector responses (or the thermocouples as an alternate) and then compares 92 the current responses to the reference responses stored in the calibration step. If the responses have not changed in an unexpected way the system waits 94 until it is time to perform another deviation detection operation. If the comparison of the current measured fixed incore detector responses with the stored measured fixed incore detector response indicates that the core power distribution has changed detectably, i.e. at least some fixed incore detector responses have changed by more than a predefined tolerance, such as 1%, depending on signal to noise ratios, etc. and acceptable Technical Specification limits, the system initiates a deviation signature analysis of the deviation signatures in the database created with respect to FIG. 3 to determine the rod configuration responsible for the observed change in the fixed incore detector responses. U.S. Pat. No. 4,637,910 describes one method of signature analysis that would be appropriate. During the signature analysis, in particular, when a change is detected, from the deviation the system can determine 96 the control rod or rod bank(s) that has moved and the direction of the movement. For example, the movement of a single rod alone (a rod drop) as compared to the movement of a bank alone will produce very different detector signal deviation patterns. The direction of insertion can be determined from the direction of the signal change. Generally, moving rods into the core lowers the magnitude of the response signal of the detectors in the vicinity of the rods while moving rods out increases the magnitude of the response signal in the vicinity of the rods. However, if the detectors are gamma sensitive and the control rods are silver-indium-cadmium or hafnium, the reverse is true.

During the search the system selects 98 the closest signature to the current detector response deviations. This selection can be made by a simple deviation magnitude comparison. If the selected signature matches 100, the rod position is output 102. If a match does not occur, the rod configuration most nearly matching expected and observed deviations is a reliable indication of the change in the rod configuration that yielded the observed change in fixed incore detector responses. From this configuration the analysis tool (BEACON) is used to calculate a range of changes in position of the identified control rod bank or individual control rod in the appropriate direction. In each calculation the system computes the deviation of calculated response stored in the calibration step 71. In particular the system can start with the closest rod configuration and assume an incremental movement 102 from the closest rod position in the direction toward the actual detector responses. The increment for this search depends on the number of steps between the signatures, which, as previously discussed depends on the bank and whether banks are combined in the move. For example, if the movement is inward and the closest signature is farther inward (that is the expected responses in a certain axial region of the core are less than the actual responses), the system makes an incremental assumed rod movement further inward from the rod position of the reference. This incremental assumed rod position is used to calculate 104 expected detector response deviations. This calculation is performed by the analytical tool used for the calculations in FIG. 3 and uses the current core conditions for power level, inlet coolant temperature, etc. The deviations in expected responses are compared 106 with the observed deviations to determine if a match exists or is very closely approximated. If no match exists, the system determines whether the calculated expected response deviation is approaching 108 the actual response deviation, that is, whether the difference is decreasing. When the difference is no longer decreasing it means that the system has searched past the actual position and the latest assumed position is output 102. As an alternative to the incremental search discussed above an interpolation scheme can be used to determine the rod position change that yielded the change in fixed incore detector responses.

The present invention has a unique advantage over the previous methods of determining control rod insertion since it addresses the primary consequence of control rod positioning, that of the effect on local power flux distribution, rather than that of secondary importance, absolute or relative control rod position. Thus, if the consequence of having one or more control rods inserted to a given degree is a local change in local nuclear power density, this local change will be evident to the nearby fixed incore detectors and to the system of this invention. If the consequence of having one or more control rods inserted to a given degree is of little concern, which would be the case if the rods are inserted in a low-worth region near the top of the core, the fixed incore detectors will be little concerned, even though current Technical Specifications, based on absolute error in rod positioning, could cause power reduction or, in the worst case, reactor shutdown. The present invention allows an unnecessary obstruction to efficient reactor operations to be avoided.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An axial rod position determination system for a control rod in a nuclear reactor core, said system comprising:
   fixed incore detectors;
   analytical, on-line signature means for periodically creating a response signature database of expected detector response deviations for assumed rod positions from a reference detector response produced at the current rod position by said fixed incore detectors; and
   rod position determination means for continuously determining a moved rod position of the control rod by scanning the signature database for a signature match between the expected detector response deviations and current detector response deviations produced by said fixed incore detectors with the control rod at the moved rod position.

2. An axial rod position determination system for a control rod in a nuclear reactor core, said system comprising;
   fixed incore detectors;
   signature means for creating a response signature database of expected detector response deviations for assumed rod positions from a reference detector response produced at the current rod position by said fixed incore detectors, said signature database being divided into inward and outward movement directions from the current rod position and according to control rod bank and individual control rod;
   rod position determination means for determining a moved rod position of the control rod by scanning the signature database for a signature match between the expected detector response deviations and current detector response deviations produced by said fixed incore detectors with the control rod at the moved rod position;
   classification means for classifying the current detector responses according to direction and bank and individual control rod; and
   said determination means scanning a portion of the signature database corresponding to the direction and the bank and individual control rod.

3. An axial rod position determination system for a control rod in a nuclear reactor core, said system comprising:
   fixed incore detectors;
   signature means for creating a response signature database of expected detector response deviations for assumed rod positions from a reference detector response produced at the current rod position by said fixed incore detectors; and
   rod position determination means for determining a moved rod position of the control rod by scanning the signature database for a signature match between the expected detector response deviations and current detector response deviations produced by said fixed incore detectors with the control rod at the moved rod position and selecting a closest expected detector response deviation; and
   incremental search means for incrementally searching for an incremental match between calculated expected detector response deviation and the current detector response deviation starting with the closest expected detector response deviation when the signature match is not found.

4. A rod position determination system for a control rod in a reactor core, said system comprising:
   fixed incore detectors;
   signature means for creating a response signature database of expected detector response deviations for assumed rod positions, a reference detector response produced at the current rod position by said fixed incore detectors and current core conditions, said signature database is divided into inward and outward move directions from the current rod position and according to control rod bank;
   rod position determination means for determining a moved rod position of the control rod by scanning the signature database for a signature match between the expected detector response deviations and current detector response deviations produced by said fixed incore detectors with the control rod at the moved rod position and selecting a closest expected detector response when the signature match does not exist;
   classification means for classifying the current detector responses according to direction and bank or individual control rod and said determination means scanning a portion of the signature database corresponding to the direction and the bank or individual control rod; and
   incremental search means for searching for an incremental match between calculated expected detector responses and the current detector responses starting from the closest expected detector response when a signature match does not exist.

5. A position determination method for determining a position of a control rod in a reactor core using a fixed incore detector, comprising:
   (a) creating a signature database of expected detector response deviations and corresponding rod positions;
   (b) detecting a change in a detector signal producing a detector signal deviation;

(c) scanning the signature database for a match between the detector signal deviation and the expected detector response deviation;
(d) outputting the corresponding rod position when a match occurs;
(e) selecting, when a match does not occur, the closest match between the detector signal deviation and the expected detector response deviation to determine a closest rod position;
(f) incrementing the closest rod position by a predetermined step movement producing an incremented position;
(g) determining a calculated detector response deviation from the incremented position; and
(h) outputting the incremented position if the calculated detector response deviation matches the detector signal deviation.

* * * * *